US010805703B1

(12) United States Patent
Bikumala et al.

(10) Patent No.: US 10,805,703 B1
(45) Date of Patent: Oct. 13, 2020

(54) AUTOMATICALLY ADJUSTING A SIZE OF HEADPHONE CUSHIONS

(71) Applicant: Dell Products L. P., Round Rock, TX (US)

(72) Inventors: Sathish Kumar Bikumala, Round Rock, TX (US); Parminder Singh Sethi, Punjab (IN); Jace W. Files, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/524,456

(22) Filed: Jul. 29, 2019

(51) Int. Cl.
*H04R 1/10* (2006.01)
*H04R 5/033* (2006.01)
*H04B 1/3827* (2015.01)

(52) U.S. Cl.
CPC ............ *H04R 1/1008* (2013.01); *H04B 1/385* (2013.01); *H04R 1/1083* (2013.01); *H04R 1/1091* (2013.01); *H04R 5/0335* (2013.01); *H04R 2201/10* (2013.01)

(58) Field of Classification Search
CPC .... H04R 25/60; H04R 1/10; H04R 2205/022; H04R 2460/13; H04R 1/1016
USPC ................. 381/322, 324, 370–371, 379–381
See application file for complete search history.

(56) References Cited

U.S. PATENT DOCUMENTS

| 8,340,338 B2 * | 12/2012 | Mlodzikowski ..... H04R 1/1016 381/328 |
| 10,721,551 B1 * | 7/2020 | Bikumala et al. ....... H04R 1/10 381/381 |
| 2002/0146142 A1 * | 10/2002 | Myers ..................... A61F 11/14 381/371 |

* cited by examiner

*Primary Examiner* — Suhan Ni
(74) *Attorney, Agent, or Firm* — Campbell Stephenson LLP; Shiv S. Naimpally

(57) ABSTRACT

A headphone may include two transducers, two cushions, one or more sensors, and an external microphone to measure an amount of noise in the external environment. The headphone may include a voice microphone to enable a user to participate in a call. Each cushion may have an associated motor to adjust a size of each cushion. A circuit located in the headphone may include a processor to receive sensor data from the sensors. The sensor data may be analyzed using machine learning to determine an activity in which the user is engaged and a location in which the headphones are located. The processor automatically adjusts aural characteristics of the headphone, including a size of each cushion, based at least in part on the activity, the location, the amount of noise present, a type of signal being sent to the transducers, and whether the user is participating in a call.

20 Claims, 7 Drawing Sheets

AUTOMATICALLY ADJUSTING A SIZE OF HEADPHONE CUSHIONS

BACKGROUND OF THE INVENTION

Field of the Invention

This invention relates generally to headphone cushions and, more particularly to automatically adjusting a size of each headphone cushion to accommodate different sized ears and to enable the headphone cushions to be adjusted from circum-aural to supra-aural.

Description of the Related Art

As the value and use of information continues to increase, individuals and businesses seek additional ways to process and store information. One option available to users is information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A headphone may be used to listen to music played back by an IHS, such as, for example, a smartphone, a smartwatch, a tablet, a laptop, a desktop, a television, or another type of media playback device. In the case of a device, such as a smartphone, that is capable of receiving and originating audio calls and/or video calls, the media playback device may have an attached microphone.

For a conventional headphone, headphone cushions are fixed in size. However, the size and shape of human ears may vary. Thus, a user desiring a headphone may audition numerous headphones to identify a headphone with cushions that are comfortable to the user's ears. In addition, a conventional headphone is designed with cushions that are either circum-aural or supra-aural. Circum-aural cushions cover the external portion of the ear (referred to as the pinna). Circum-aural cushions are designed to go around and enclose the user's ears to provide insulation from external noises. Thus, a user may use a headphone with circum-aural cushions in a noisy environment, such as in a commuter vehicle, in an office, or the like, to prevent external noises from intruding in on the user's listening experience. A supra-aural headphone may have cushions that press against the ears, rather than enclose the ears, resulting in less attenuation of external noises. Thus, a user may use a headphone with supra-aural cushions in a relatively quiet environment, such as at home, to enable the user to hear external sounds, such as monitoring children playing or enabling the user's spouse to obtain the user's attention.

Thus, a user may have to audition numerous headphones to identify a particular headphone that comfortably fits the user's ears. In addition, the user may purchase at least one circum-aural headphone (e.g., for noisy environments where the user desires to block the ambient noise) and one supra-aural headphone (e.g., for environments where the user desires to hear external sounds) to accommodate the different situations in which the user may listen to music, play games, or converse with others.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

For example, a headphone may include two transducers, two cushions, one or more sensors, and an external microphone to measure an amount of noise in the external environment. The headphone may include a voice microphone to enable a user to participate in a call. Each cushion may have an associated motor to adjust a size of each cushion. A circuit located in the headphone may include a processor to receive sensor data from the sensors. The sensor data may be analyzed using machine learning to determine an activity in which the user is engaged and a location in which the headphones are located. The processor may automatically adjust aural characteristics of the headphone, including a size of each cushion, based at least in part on the activity, the location, the amount of noise present, a type of signal being sent to the transducers, and whether the user is participating in a call. For example, the processor may adjust a size of the cushions to change the cushions from having supra-aural characteristics to having circum-aural characteristics. The processor may use digital signal processing to perform noise cancellation, add equalization to the audio signal being sent to the transducers, increase voice quality when the user is participating in a call, or any combination thereof.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
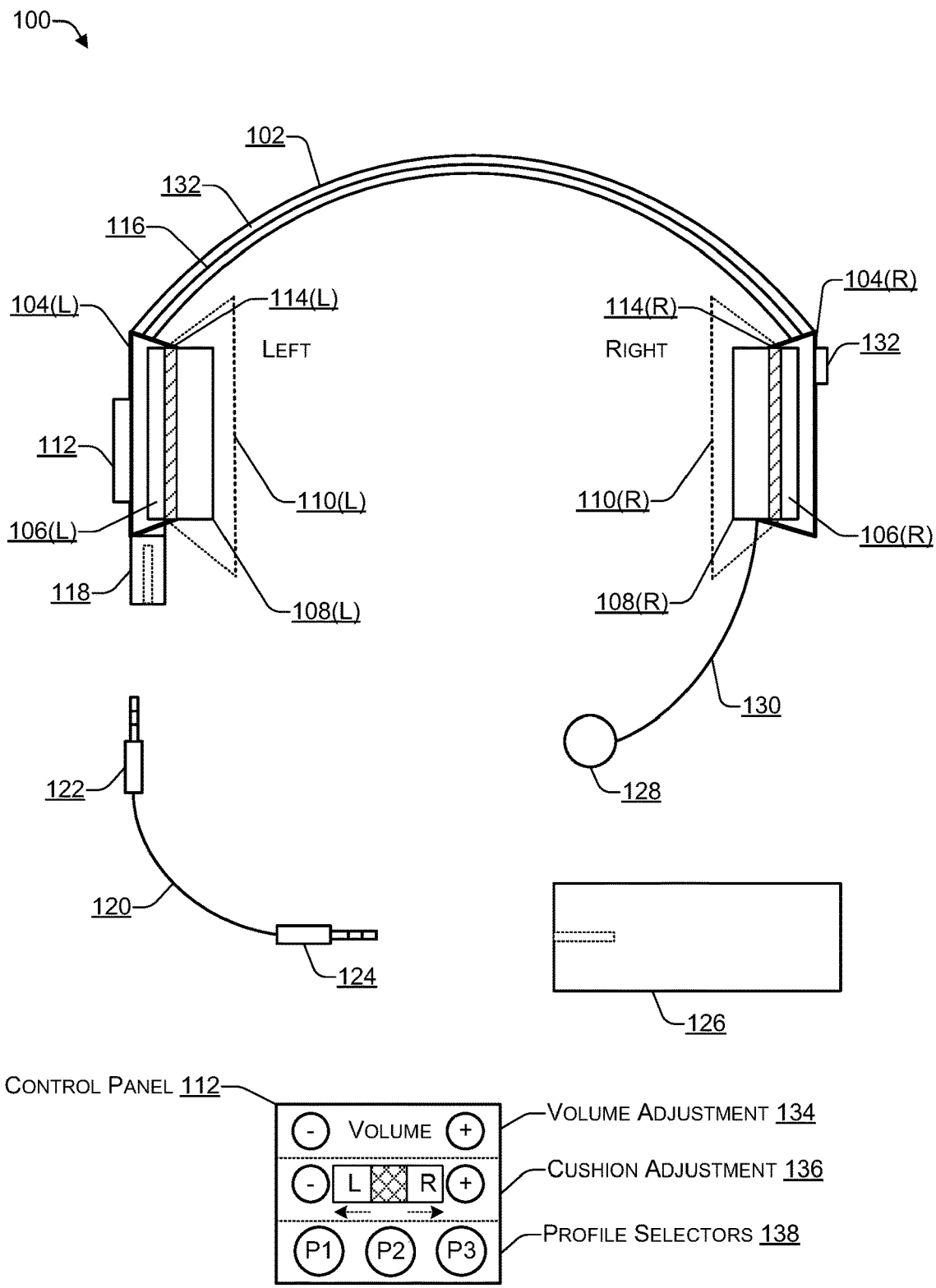
FIG. 1 is a block diagram of a headphone, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein enable a size of cushions of a headphone to be automatically modified. A headphone may also be referred to as a pair of headphone because each headphone has two (e.g., a pair of) transducers and two cushions. The size of the cushions may be automatically modified from circum-aural to supra-aural. For example, an external facing microphone may be incorporated into a portion of the headphone to measure an ambient noise level. When the ambient noise level exceeds a predetermined threshold, the headphone may use a piezo-electric motor (or similar mechanism) to automatically adjust the cushions by changing the cushions from supra-aural to circum-aural to block more of the external ambient noise. When the ambient noise level subsides and is equal to or below the predetermined threshold, the headphone may use the piezo-electric motor to automatically adjust the cushions by changing the cushions from circum-aural to supra-aural. Of course, an override feature may enable a user to prevent the automatic adjustment in situations where the user desires to use the supra-aural cushions to hear the ambient environment or when the user desires supra-aural cushions to provide further noise isolation in a relatively quiet environment. In this way, the headphone may automatically determine the ambient noise level associated with the user's environment and adjust the size of the cushions, adjust noise cancellation properties or both. For example, if the user is in a noisy environment such as a bus or an airplane, the headphone may automatically adjust the cushions and noise cancellation to reduce ambient noise.

The headphone cushions may be adjusted automatically based on how the headphone are being used. For example, if a user initiates a call (e.g., phone call, audio conferencing call, video conferencing call or another type of call) and starts using a microphone, then the headphone may automatically adjust the cushion size and noise cancellation to emphasize voice clarity. As another example, if the headphone detects a relatively broad spectrum of frequencies, indicating that the user is listening to music or watching a movie, the headphone may automatically adjust the cushions to circum-aural (e.g., to increase bass frequencies), and in some cases, add frequency equalization (EQ) to enhance the listening experience.

The cushions may be automatically adjusted using a motor, such as, for example, a piezoelectric motor built in to each earcup. A circuit built-in to the headphone may automatically expand or contract the cushions based on (i) the ambient noise level and (ii) the application (e.g., a call, listening to music, listening to a movie, or the like) for which the headphone is being used. Of course, the user may override the settings selected by the headphone. For example, the user may turn off the auto-adjust feature of the cushions and manually configure the headphone. The piezoelectric motor may modify a size of the cushions relatively quietly, e.g., generating no more than 10 decibels (db), to enable the cushions to be adjusted without audibly impacting the user's experience. The motor may be powered by the audio signal being provided to each of the transducers.

The headphone may monitor the content being output by the transducers of the headphone and, if a microphone is present, the input being provided by the user to the microphone. The headphone may use machine learning to analyze the content being output and the input being provided to determine an activity (e.g., listening to music, watching a movie, participating in a call, or the like) in which the user is engaged, determine an ambient noise level (e.g., using one or more microphones placed on an external surface of the headphone), and automatically adjust the headphone, including the cushion size, the aural characteristics, and the like, based on the activity and the ambient noise level.

If multiple users use the same headphone, each user may create a profile. For example, a first profile may be associated with a first user and a second profile may be associated with a second user. Each profile may customize the size of the cushions (e.g., based on a size of the user's ears) and the aural characteristics (e.g., supra-aural or circum-aural, noise cancellation on or off, equalizer settings, and the like) of the headphone. In some cases, the profiles may be stored in a memory of the headphone and a user may select the profile (e.g., profile 1 or profile 2) using a selection mechanism. For example, a selector switch located on an external surface of the headphone may enable the user to select a particular profile. As another example, the headphone may use a nearfield wireless technology (e.g., Bluetooth, WiFi, ZigBee, or the like) to determine the user's identity based on device associated with the user that is within a predetermined distance from the headphone (e.g., a smartwatch that the user is wearing or a smartphone that the user is carrying), determine a user profile associated with the user, and automatically configure the headphone based on the user profile. As yet another example, a particular user may use an application ("app") being executed by the smartwatch or smartphone to select one of multiple profiles (e.g., jazz music profile, rock music profile, movie profile, call profile, such as a phone call, a conference call, or the like). Selecting a particular profile on the app may cause the smartwatch or smartphone to send one or more instructions to the headphone to configure the headphone based on the profile. Thus, each user may create and use multiple profiles.

The headphone may include one or more sensors (e.g., accelerometer, gyroscope, and the like). The headphone may use output from the sensors to detect an activity (e.g., running, walking, stair climbing, weight lifting, or the like) and automatically adjust the size of the cushions and the aural characteristics (e.g., supra-aural or circum-aural, noise cancellation on or off, equalizer settings, and the like) of the headphone accordingly.

The user may enable a setting where a volume at which the transducers output sound waves may be proportional to the cushion size. For example, if the user increases the volume, then the headphone may automatically change from supra-aural to circum-aural to provide more noise isolation, resulting in a perceived increase in volume. If the user decreases the volume (e.g., possibly indicating that the user desires to hear something in the ambient environment), then the headphone may automatically change from circum-aural to supra-aural to provide less noise isolation, enabling the user to hear more sounds in the external environment.

As a first example, a headphone may include: (i) a headband, (ii) a first housing attached to a first end of the headband, and (iii) a second housing attached to a second end of the headband. The first housing may include a first transducer, a first cushion, and a first motor to control a first size of the first cushion. The second housing may include a second transducer, a second cushion, and a second motor to control a second size of the second cushion. A circuit located in the first housing may include one or more processors and a memory device to store instructions that are executable by the one or more processors to perform various operations. For example, the operations may include determining a type of audio signal being sent to the first transducer and the second transducer. The type of audio signal may include one of a voice signal, a music signal, or a movie soundtrack. The operations may include automatically adjusting the first size of the first cushion and the second size of the second cushion based at least in part on the type of audio signal. The headphone may include an external microphone to determine an amount of external noise that is present. The operations may include determining that the amount of external noise exceeds a predetermined amount, automatically inverting a phase of the external noise to create inverted noise, and adding a portion of the inverted noise to the audio signal being sent to the first transducer and to the second transducer to perform noise cancellation. The operations may include receiving sensor data from one or more sensors, determining a location of the headphone based at least in part on the sensor data, and automatically adjusting the first size of the first cushion and the second size of the second cushion based at least in part on the location. The operations may include determining an activity associated with a user of the headphone based at least in part on the sensor data and automatically adjusting the first size of the first cushion and the second size of the second cushion based at least in part on the activity. For example, the activity may be determined using a machine learning algorithm to analyze the sensor data. The one or more sensors may include an accelerometer, a gyroscope, and a global positioning satellite (GPS) sensor. The headphone may include a communications interface located in either the first housing or the second housing. The communications interface may include at least one of: (i) a wireless communications interface, or an electronic receptacle to accept a jack attached to a cable. The headphone may include a boom having a flexible metal rod. A first end of the boom may be attached to either the first housing or the second housing and a voice microphone may be attached to a second end of the boom.

As a second example, a headphone may include a circuit. The circuit may include an external microphone, one or more processors, and a memory device to store instructions that are executable by the one or more processors to perform various operations. For example, the instructions may include determining a type of audio signal being sent to a first transducer and to a second transducer of a headphone. The operations may include receiving an external audio signal from the external microphone and determining an amount of external noise present based on the external audio signal. In response to determining that the amount of external noise exceeds a predetermined amount, the operations may include automatically initiating noise cancellation. For example, initiating the noise cancellation may include inverting a phase of the external noise to create inverted noise and adding a portion of the inverted noise to the audio signal being sent to the first transducer and to the second transducer. The operations may include automatically adjusting a first size of the first cushion and a second size of the second cushion based at least in part on (i) the type of audio signal and (ii) the amount of external noise. The circuit may include one or more sensors, such as, for example, an accelerometer, a gyroscope, and a global positioning satellite (GPS) sensor. The operations may include receiving sensor data from the one or more sensors, determining a location of the headphone based at least in part on the sensor data, and automatically adjusting the first size of the first cushion and the second size of the second cushion based at least in part on the location. The operations may include determining, using machine learning, an activity associated with a user of the headphone based at least in part on the sensor data and automatically adjusting the first size of the first cushion and the second size of the second cushion based at least in part on the activity.

A headphone may include an external microphone, a headband, a first housing attached to a first end of the headband, and a second housing attached to a second end of the headband. The first housing may include a first transducer, a first cushion, and a first motor to control a first size of the first cushion. The second housing may include a second transducer, a second cushion and a second motor to control a second size of the second cushion. A circuit may be located in the first housing. The circuit may include one or more processors and a memory device to store instructions that are executable by the one or more processors to perform various operations. For example, the operations may include receiving external audio data from the external microphone, determining an amount of external noise present in the external environment based on the external audio data, determining that the amount of external noise exceeds a predetermined amount, and automatically inverting a phase of the external noise to create inverted noise. The operations may include (i) adding a portion of the inverted noise to the audio signal being sent to the first transducer and the second transducer to perform noise cancellation and (ii) automatically adjusting, based at least in part on determining that the amount of external noise exceeds the predetermined amount, the first size of the first cushion; and the second size of the second cushion. The operations may include determining a type of audio signal being sent to the first transducer and to the second transducer. The type of audio signal may include one of voice, music, or a movie soundtrack. The operations may include automatically adjusting the first size of the first cushion and the second size of the second cushion based at least in part on the type of audio signal. The operations may include receiving sensor data from one or more sensors, such as, for example, an accelerometer, a gyroscope, and a global positioning satellite (GPS) sensor. The operations may include determining a location of the headphone based at least in part on the sensor data and automatically adjusting the first size of the first cushion and the second size of the second cushion based at least in part on the location. The operations may include determining an activity associated with a user of the headphone based at least in part on the sensor data and automatically adjusting the first size of the first cushion and the second size of the second cushion based at least in part on the activity. The headphone may include a boom comprising a flexible metal rod in which a first end of the boom is attached to either the first housing or the second housing and a voice microphone is attached to a second end of the boom. The operations may include determining, based on voice data received from the voice microphone, that a user of the headphone is participating in a call, dividing the audio signal being sent to the first transducer and the second transducer into three bands comprising (i) a speech frequency band, (ii) a below speech frequency band, and (iii) an above speech frequency band. The operations may include reducing a volume of the below speech frequency band and the above speech frequency band.

FIG. 1 is a block diagram of a headphone, according to some embodiments. The headphone 100 may include a headband 102. On either side (e.g., (L)=left side and (R)=right side) of the headband 102, a housing 104(L), 104(R) may include a transducer (e.g., a speaker) 106(L), 106(R) to provide audio output. A cushion 108(L), 108(R) may be attached to the housing 104(L), 104(R), respectively, and may be increased in size up to a larger sized cushion 110(L), 110(R), respectively. A control panel 112 may be located on one of the housings 104(L) or 104(R). A motor 114(L) (e.g., a piezoelectric motor) may be used to adjust a size of the left cushion between a small size 108(L) and a large size 110(L). A motor 114(R) may be used to adjust a size of the right cushion between the small size 108(L) and the large size 110(L). The control panel 112 may include a volume adjustment 134 (e.g., "+"=increase, "−"=decrease) to adjust a volume of audio being output by the transducers 106, a cushion adjustment 136 to select (e.g., L=left cushion, R=right cushion, center position adjusts both simultaneously) and adjust (e.g., "+"=increase, "−"=decrease) a size of each of the cushions 108, and one or more profiles 138. The cushion adjustment 136 may engage the motors 114 to adjust a size of one or both of the cushions 108(L), 108(R). For example, selecting "+" of the cushion adjustment 136 (or a first user profile P1 of the profiles 138) may cause the cushions 108(L), 108(R) to increase in size up to the larger sized cushions 110(L), 110(R). Selecting "−" of the cushion adjustment 136 (or a second user profile P2 of the profiles 138) may cause the associated cushion 110(L), 110(R) to decrease in size to the smaller sized cushions 108(L), 108(R).

Each of the cushions 108, 110 may be adjustable to a size from between about 50 millimeters (mm) by 35 mm by 5 mm (length×width×depth) to about 70 mm by 45 mm by 40 mm (length×width×depth). For example, the cushions 108 may have a size of about 50 mm×35 mm×5 mm while the cushions 110 may have a size of about 70 mm by 45 mm by 40 mm. Depth may also be referred to as thickness. The cushions 108(L), 108(R) may have supra-aural properties, e.g., allowing external sounds to be heard while the headphone 100 are being worn. The cushions 110(L), 110(R) may have circum-aural properties, e.g., blocking external sounds from being heard while the headphone 100 are being worn. The size of the cushions 108(L), 108(R) may be increased or decreased using the motors 114(L), 114(R) to any size between 108 to 110.

The headphone 100 may automatically adjust a size of the cushions 108, 110, (i) based on a type of content (e.g., music, movie, voices and the like) being output by the transducers 106, (ii) based on whether a user is speaking into a voice microphone 128 (e.g., volume of audio received by the voice microphone 128 is greater than a predetermined amount, e.g., 50 db), (iii) an amount of ambient noise picked up by an environmental microphone 132, or any combination thereof. Based on the size of the cushions 108, 110, the headphone 100 may automatically use a digital filter to modify a frequency response of the transducers 106(L), 106(R). To illustrate, a small circuit, as described in more detail in FIG. 2, may be located in one or both of the housings 104(L), 104(R). The digital filter may be may be provided a digital signal processor (DSP) to modify frequencies in the audio being played back by the transducers 106(L), 106(R). For example, because the cushions 108(L), 108(R) may have supra-aural properties, the digital filter may provide a bass-boost by increasing an amount of gain of frequencies between 10 Hertz (Hz) to about 100 Hz. As another example, because the cushions 108(L), 108(R) may have supra-aural properties, the digital filter may provide a loudness curve (e.g., Fletcher-Munson loudness curve), by increasing an amount of gain of bass frequencies between 10 Hz to about 100 Hz and increasing an amount of gain of treble frequencies between about 1000 Hz to 10,000 Hz. The digital filter may provide noise cancellation by taking an ambient audio sample using the environmental microphone 132, inverting (e.g., by 180 degrees) a phase of the ambient audio sample, and mixing the inverted ambient audio in with the audio being provided to the transducers 106, thus cancelling out the ambient audio being heard by the user through the cushions 108, 110. The amount of noise cancellation may be user adjustable using the control panel 112.

When the cushion adjustment 136 is set to a middle setting (e.g., between the "L" and the "R", as illustrated in FIG. 1), a linkage 116 between the motors 114(L), 114(R) may be engaged, enabling the user to adjust a size of both cushions 108(L), 108(R) simultaneously. For example, when the linkage is enabled by using the middle setting of the cushion adjustment 136, increasing a cushion size using "+" of the cushion adjustment 136 may cause both of the cushions 108(L), 108(R) to simultaneously increase in size to create the larger sized cushions 110(L), 110(R). When the linkage is enabled by using the middle setting of the cushion adjustment 136, decreasing a cushion size using "−" of the cushion adjustment 136 may cause both of the cushions 110(L), 110(R) to simultaneously decrease in size to create the smaller sized cushions 108(L), 108(R). The linkage 116 may be disabled when either "L" or "R" of the cushion adjustment 136 are selected to enable the user to independently adjust the size of each of the cushions 108. For example, when the linkage 116 is disabled, the cushion 108(L) may be increased in size to create the larger sized cushion 110(L), without affecting a size of the cushion 108(R). When the linkage 116 is disabled, the cushion 108(R) may be increased in size to create the larger sized cushion 110(R), without affecting a size of the cushion 108(L). The headband 102 may include a cavity 132 (e.g., a hollow channel) through which the linkage 116 runs. The linkage 116 may be a mechanical linkage, such as a cable (e.g., a metal cable or a polypropylene cable) or an electrical linkage between the motors 106. In some cases, the mechanical linkage may include a spring-loaded spool located in one or both of the housings 104(L), 104(R). When the linkage 116 is engaged, the cushion adjustment 136 may be used to decrease a size of the cushions 110, thereby causing the linkage 116 (e.g., cable) to be wound on to the spool. When the linkage 116 is disengaged, the spring-loaded mechanism may release the linkage 116 (e.g., cable) from the spool. When the linkage 116 is an electrical linkage between the motors 106, if the linkage 116 is engaged, then both of the motors 106 may adjust their respective cushions 108 simultaneously, and if the linkage 116 is disengaged, then one of the motors 106(L), 106(R) may adjust their respective cushion independently of the other cushion.

At its smallest size, an extension portion (e.g., 20% to 60%) of each of the cushions 108(L), 108(R) may be stored in the respective housings 104(L), 104(R) in a compressed form. For example, the cushions 110(L), 110(R) may be made using an open cell foam, enabling the foam of the extension portions to be stored in a compressed form in the housings 104(L), 104(R). Changing a size of one or both (depending on whether the linkage 116 is engaged or disengaged) of the cushions 108 may cause the extension portions of the cushions 108(L), 108(R) that was stored (in a compressed form) in the housings 104(L), 104(R) to be extracted from the respective housings 104(L), 104(R). For the larger sized cushions 110(L), 110(R), the extension portions of the cushions 108(L), 108(R) were previously extracted from the respective housings 104(L), 104(R). Changing a size of one or both (depending on whether the linkage 116 is engaged or disengaged) of the cushions 110 may cause the extension portion of the cushions 108(L), 108(R) to be retracted and stored in the respective housings 104(L), 104(R).

The headphone 100 may include a communication interface 118. For example, the communication interface 118 may include a wireless interface that enables the headphone 100 to wirelessly receive (and in some cases send) data (e.g., including audio data). To illustrate, the communication interface 118 may use a wireless standard, such as, for example, Wi-Fi®, Bluetooth®, Apt-X, or the like, to wireless communicate audio data. The communication interface 118 may, in some cases, include an electronic receptacle to enable a cable 120 to connect the headphone 100 to a media playback device 126 (e.g., an information handling system). For example, a first jack 122 of the cable 120 may engage with the electronic receptacle of the communications interface 118 while a second jack 124 may engage with an electronic receptacle of the media playback device 126. Alternately, the communication interface 118 may communicate with the media playback device 126 via a wireless technology, such as Wi-Fi®, Bluetooth®, or the like. For wireless transmission, a wireless antenna may be located: inside the housing 106(L), inside the cavity of the headband 102, inside the housing 106(R), or any combination thereof.

In some cases, the headphone 100 may include the voice microphone 128 that is attached to the headphone 100 by an adjustable boom 130. For example, the voice microphone 128 may be used by the user of the headphone 100 to answer or originate a call (e.g., phone call or conference call), to talk to other players when the user is playing a video game, participate in a conference (e.g., audio or video conference) call and the like. In some cases, the boom 130 and the voice microphone 128 may be detachable from the headphone 100. For example, the user can detach the boom 130 and the voice microphone 128 from the headphone 100 to listen to music and attach the boom 130 and the voice microphone 128 to the headphone 100 to make a phone call or play a video game.

The headband 102 may be made using plastic (e.g., Polytetrafluoroethylene (PTFE) or similar), a metal (e.g., steel, aluminum, an alloy, or the like), or a combination thereof. The cushions 108 may be made using an open-cell foam material that is relatively acoustically transparent (e.g., neutral). The boom 130 may be a flexible metal rod that is between about 75 mm to 150 mm in length. A user may use the flexibility of the boom 130 to manually position the voice microphone 128 near the user's mouth.

Figure 2:
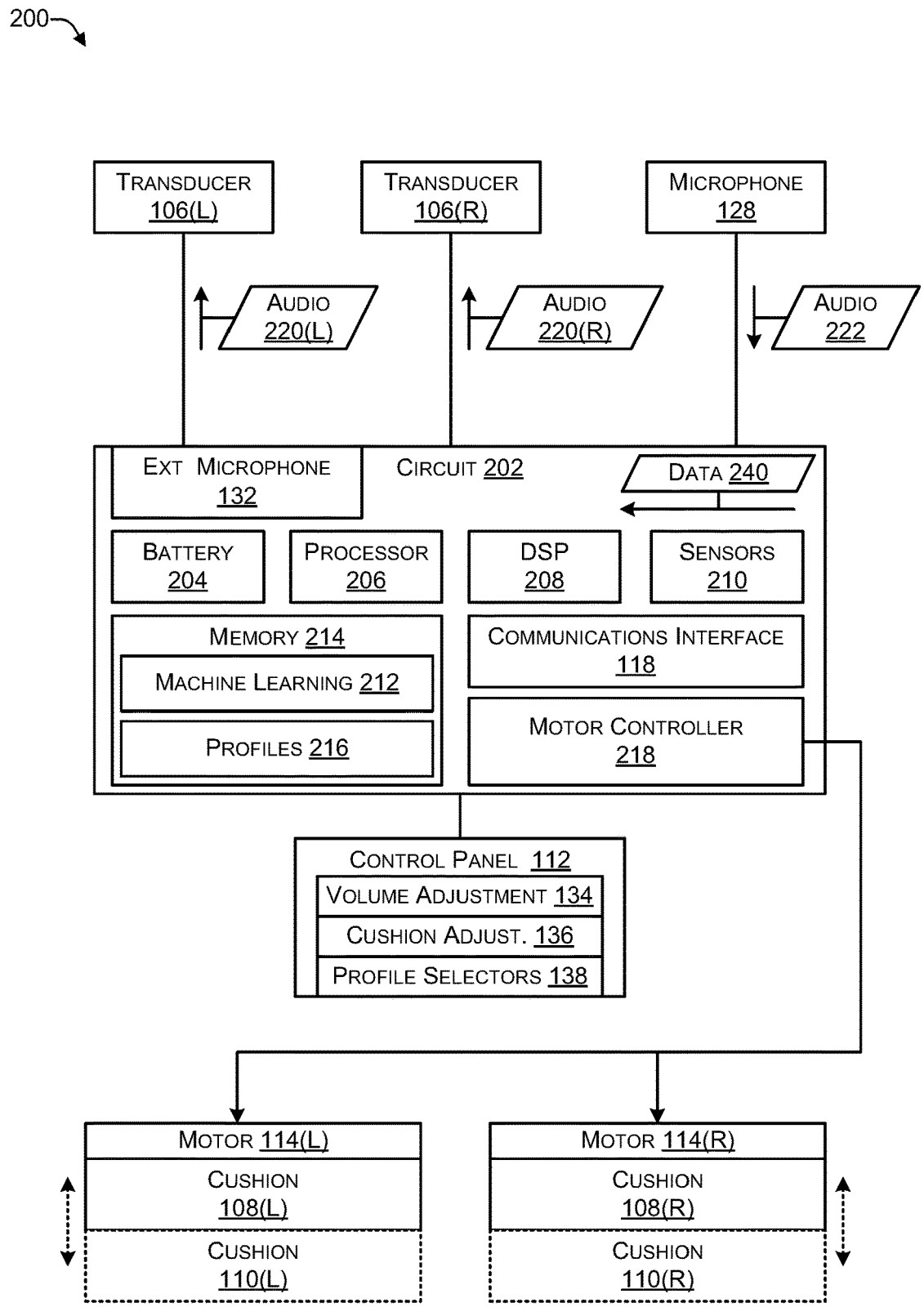
FIG. 2 is a block diagram illustrating components of a circuit included in a headphone, according to some embodiments.

FIG. 2 is a block diagram illustrating components of a circuit included in a headphone, according to some embodiments. For example, a circuit 202 may be located in the housing 104(L), the housing 104(R), or both (e.g., a part of the circuit 202 may be located in the housing 104(L) and a remaining part of circuit 202 may be located in the housing 104(R)).

The circuit 202 may include a battery 204, a processor 206, a digital signal processing (DSP) 208, one or more sensors 210, the communications interface 118, a machine learning module 212, a memory 214 storing one or more profiles 216, and the motor controller 218. The battery 204 may be a rechargeable battery (e.g., Nickel Metal Hydride (NiMH), Lithium Ion (LiON), or the like) or a non-rechargeable battery that provides power to the components of the circuit 202. The processor 206 may be an embedded controller, a reduced instruction chip set (RISC) processor, or another type of hardware device capable of executing logic instructions. The DSP 208 may be a specialized hardware device configured with instructions to manipulate (e.g., process) audio signals or the DSP 208 may be software (or firmware) instructions to process audio signals. The sensors 210 may include the environmental microphone 132 of FIG. 1, a gyroscope, an accelerometer, a global positioning satellite (GPS) or another type of location determining sensor, and the like. The machine learning 212 may be a software module that has been trained using historical data (e.g., audio data and sensor data). For example, sensor data 240 provided by the sensors 210 may enable the processor 206 executing the machine learning 212 to determine a location of a user, one or more activities in which the user is engaged, and the like. Based on this information, the processor 206 may automatically adjust the cushions 108(L), 108(R) based on the location, the activities, or both. For example, the processor 206 executing the machine learning 212 may determine, based on the sensor data 240, based on audio 220(L), 220(R) being sent to the transducers 106(L), 106(R), based on audio 222 sent by the microphone 128, and ambient environment audio captured by the external microphone 132, that the user is in a gym listening to music, in a restaurant participating in a call (e.g., based on the audio 222), relaxing at home watching a movie or listening to music, on an airplane watching a movie or listening to music, or at another location performing another type of activity, and automatically (e.g., without human interaction) adjust the cushions 108(L), 108(R) accordingly.

A memory 214 may be used to store various algorithms, such as, for example, the DSP 208, the machine learning 212, and one or more profiles 216. For example, selecting one of the profile selectors 138 may cause the processor 206 to select and apply one of the profiles 216.

Figure 3A:
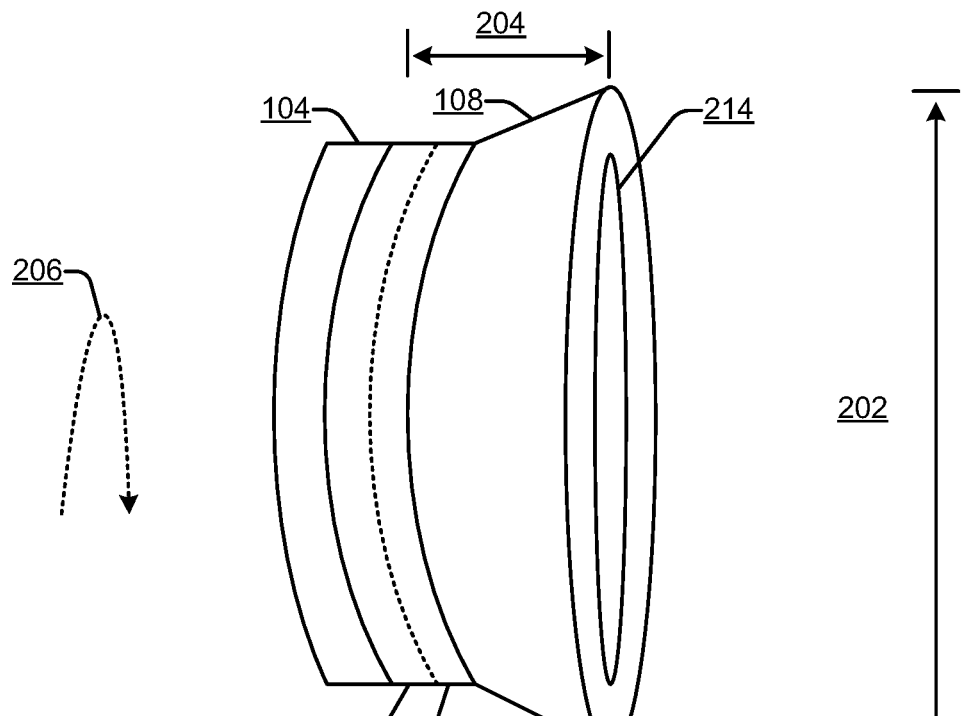
FIG. 3A illustrates a first perspective of a cushion in a supra-aural configuration, according to some embodiments.

FIG. 3A illustrates a first perspective of a cushion in an initial size (e.g., supra-aural configuration), according to some embodiments. The cushion 108 may have an initial size comprising an initial length 202 (e.g., about 50 mm) and an initial depth 204 (e.g., about 5 mm). In some cases, the cushion 108 may have an opening 214 into which an ear is placed. In other cases, the cushion 108 may not have the opening 214.

The cushion 110 may include an extension portion 216 that is stored in a compressed form in the corresponding housing 104. To increase a size of the cushion 108, the motors 114 may move in a first direction 202 (e.g., clockwise) causing the cushions 108 to increase to a larger size, as illustrated in FIG. 2B. For example, the motion of the piezo-electric motor 114 may cause the extension portion 216 to be extracted from the housing 104, thereby increasing the size of the cushions 108 to create the larger sized cushions 110.

Figure 3B:
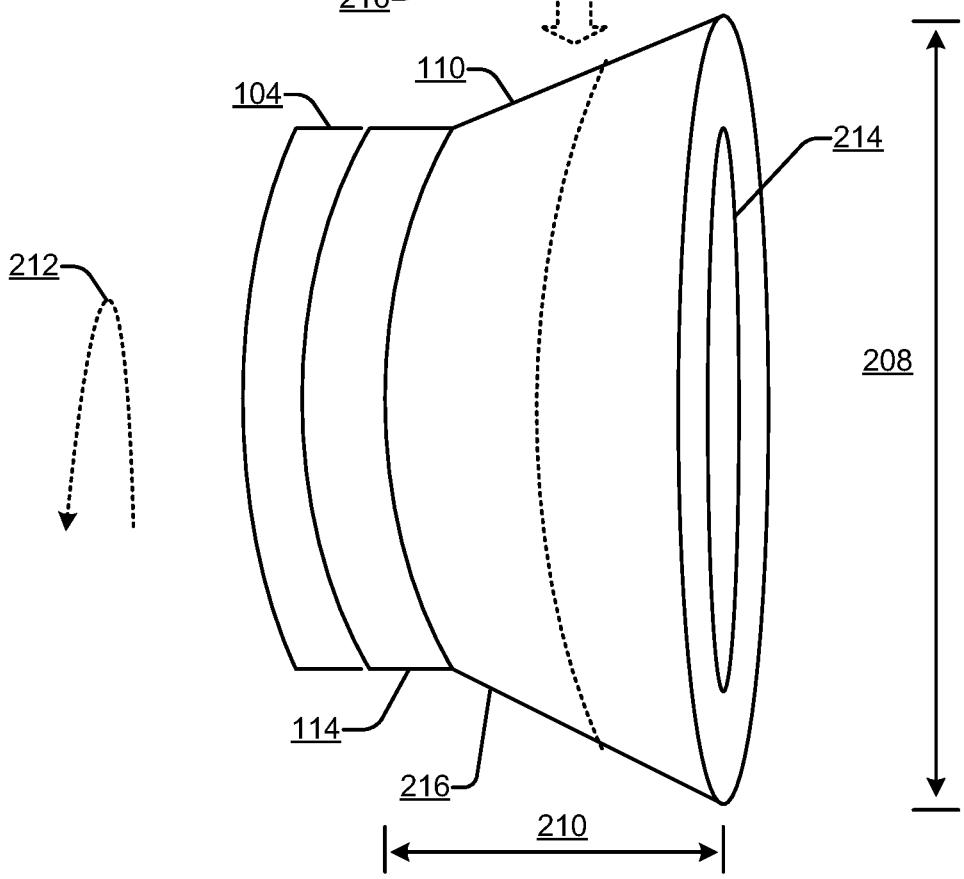
FIG. 3B illustrates a first perspective of a cushion in a circum-aural configuration, according to some embodiments.

FIG. 3B illustrates a first perspective of a cushion in a larger size (e.g., circum-aural configuration), according to some embodiments. The cushions 110 may have a size comprising a length 208 (e.g., about 70 mm) and a depth 210 (e.g., about 40 mm). The cushion 110 may include an extension portion 216 that was extracted from the housing 104 to increase the size of the cushion 108 to create the larger sized cushion 110. To decrease a size of the cushion 210, the motors 114 may move in a second direction 212 (e.g., counter-clockwise) causing the cushions 108 to decrease to the size illustrated in FIG. 2A. The second direction 212 may be opposite the first direction 206 of FIG. 2A. For example, the motors 114 moving in the second direction 202 may cause the extension portion 216 to be stored in a compressed form in the housing 104, thereby decreasing the size of the cushion 110 back to the cushion 108.

Figure 4A:
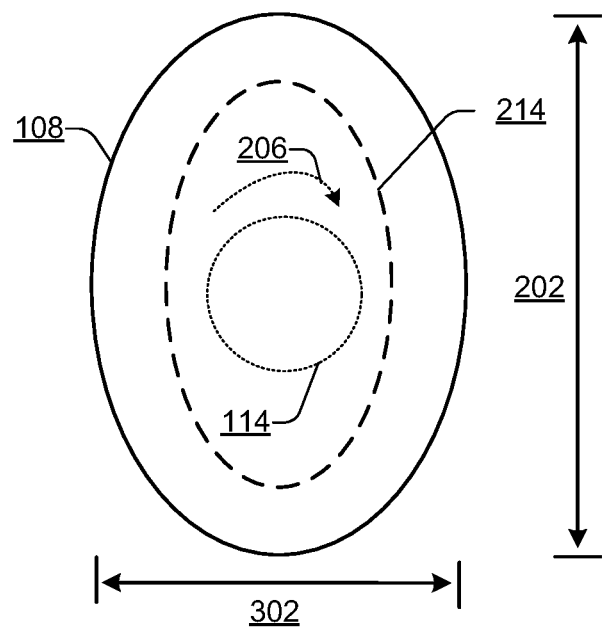
FIG. 4A illustrates a second perspective of a cushion in a supra-aural configuration, according to some embodiments.

FIG. 4A illustrates a second perspective of a cushion in an initial size (e.g., supra-aural configuration), according to some embodiments. The cushions 108 may have an initial size of the initial length 202 (e.g., about 50 mm) and an initial width 302 (e.g., about 35 mm). To increase a size of the cushions 108, the motors 114 may rotate in the first direction 202 (e.g., clockwise) causing the cushions 108 to increase to a larger size as illustrated in FIG. 3B.

Figure 4B:
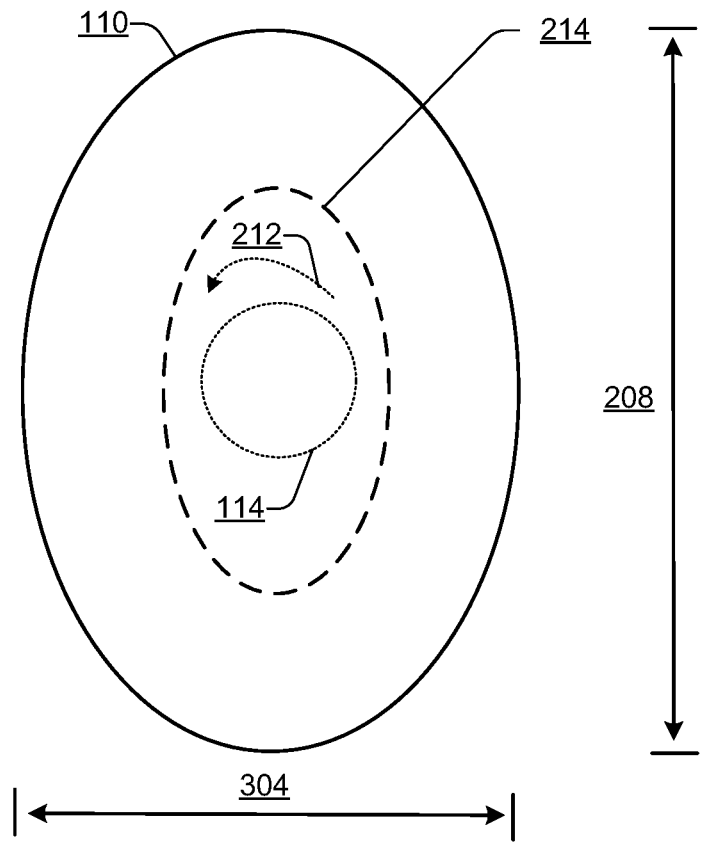
FIG. 4B illustrates a second perspective of a cushion in a circum-aural configuration, according to some embodiments.

FIG. 4B illustrates a second perspective of a cushion in a larger size (e.g., circum-aural configuration), according to some embodiments. The cushions 110 may have a length 208 (e.g., about 70 mm) and a width 304 (e.g., about 45 mm). To decrease a size of the cushions 110, the motors 114 may move in a second direction 212 (e.g., counter-clockwise) causing the cushions 110 to decrease to the size illustrated in FIG. 2A. The second direction 212 may be opposite the first direction 206 of FIG. 2A.

In FIGS. 1, 2, 3A, 3B, 4A and 4B, if the first direction is clockwise then the second direction is counter-clockwise. If the first direction is counter-clockwise then the second direction is clockwise.

Figure 5:
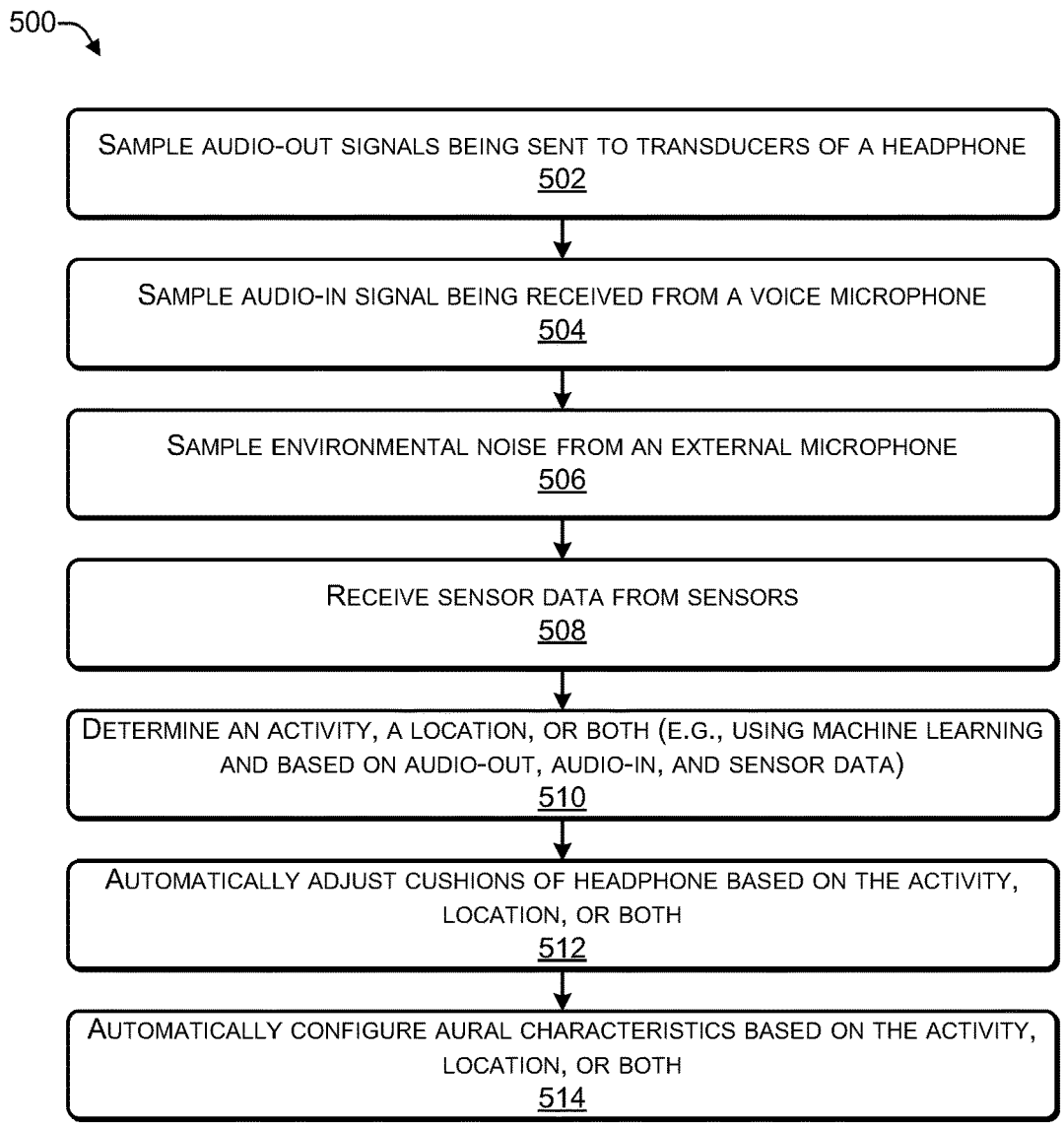
FIG. 5 is a flowchart of a process that includes automatically adjusting one or more cushions of a headphone based on a location, an activity, or both, according to some embodiments.

In the flow diagram of FIG. 4 and FIG. 5 each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 400 is described with reference to FIGS. 1, 2, 3A, 3B, 4A and 4B as described above, although other models, frameworks, systems and environments may be used to implement these processes.

FIG. 5 is a flowchart of a process 500 that includes automatically adjusting one or more cushions of a headphone based on a location, an activity, or both, according to some embodiments. The process 500 may be performed by one or more components of the circuit 202 of FIG. 2.

At 502, the process may sample audio-out signals being sent to transducers of a headphone. At 504, the process may sample an audio-in being received from a voice microphone connected to the headphone. At 506, the process may sample environmental noise being received from an external microphone connected to the headphone. At 508, the process may receive sensor data from one or more sensors. For example, in FIG. 2, the processor 206 may sample the audio signal 220(L), 220(R) being sent to the transducers 106(L), 106(R), respectively and sample the audio signal 222 being sent by the microphone 128. The processor 206 may sample the audio of the external environment based on audio provided by the external microphone 132. The processor 206 may receive the sensor data 240 from the sensors 210 (e.g., accelerometer, gyroscope, GPS or another location-providing sensor, another type of sensor, or the like).

At 508, the process may determine (e.g., using machine learning) an activity, a location, or both associated with a user that is wearing the headphone, e.g., based on one or more of (i) the sample of the audio-out, (ii) the sample of the audio-in, the sample of the environmental audio, and/or (iv) the sensor data. At 510, the process may automatically adjust one or more cushions of the headphone based on the activity, the location, or both. At 512, the process may automatically configure aural characteristics of the headphone based on the activity, the location, or both. For example, in FIG. 2, the processor 206 may execute the machine learning 212 to determine an activity in which a user wearing the headphone 100 is engaged, a location in which the user is located, or both. The processor 206 may instruct the motor controller 218 to adjust the cushions 108 using the motors 114 based on the activity in which the user is engaged, the location of the user, or both. For example, the processor 206 executing the machine learning 212 may determine, based on the sensor data 240, based on audio 220(L), 220(R) being sent to the transducers 106(L), 106(R), based on audio 222 sent by the microphone 128, and ambient environment audio captured by the external microphone 132, that the user is in a gym listening to music, in a restaurant participating in a call (e.g., based on the audio 222), relaxing at home watching a movie or listening to music, on an airplane watching a movie or listening to music, or at another location performing another type of activity, and automatically (e.g., without human interaction) adjust the cushions 108(L), 108(R) accordingly. The processor 206 may use the DSP 208 to adjust the aural characteristics of the audio 220(L), 220(R). For example, if the environment in which the user is located is noisy (e.g., greater than a predetermined threshold, such as, for example, 40 db), the processor 206 may repeatedly sample the environmental audio from the external microphone, invert (180 degrees) the phase, and insert the inverted sample into the audio 220 to provide noise cancellation. The processor 206 may modify a size of the cushions 108 to change their characteristics from supra-aural to circum-aural to provide the user with noise isolation. If the user is engaged in a call (phone call, conference call, or the like), the processor 206 may adjust the DSP 208 to increase voice quality (e.g., improve intelligibility) by filtering out frequency bands above and below the frequencies used by the human voice. If the user is listening to music, the processor 206 may adjust the DSP 208 according to the user's preferences. If the user is watching a movie, the processor 206 may adjust the DSP 208 according to the user's preferences.

Thus, a circuit located in a housing of a headphone may monitor what the user is listening to, whether the user is speaking or not, and an amount of noise in the environment and automatically adjust the cushions and aural characteristics of the transducers.

Figure 6:
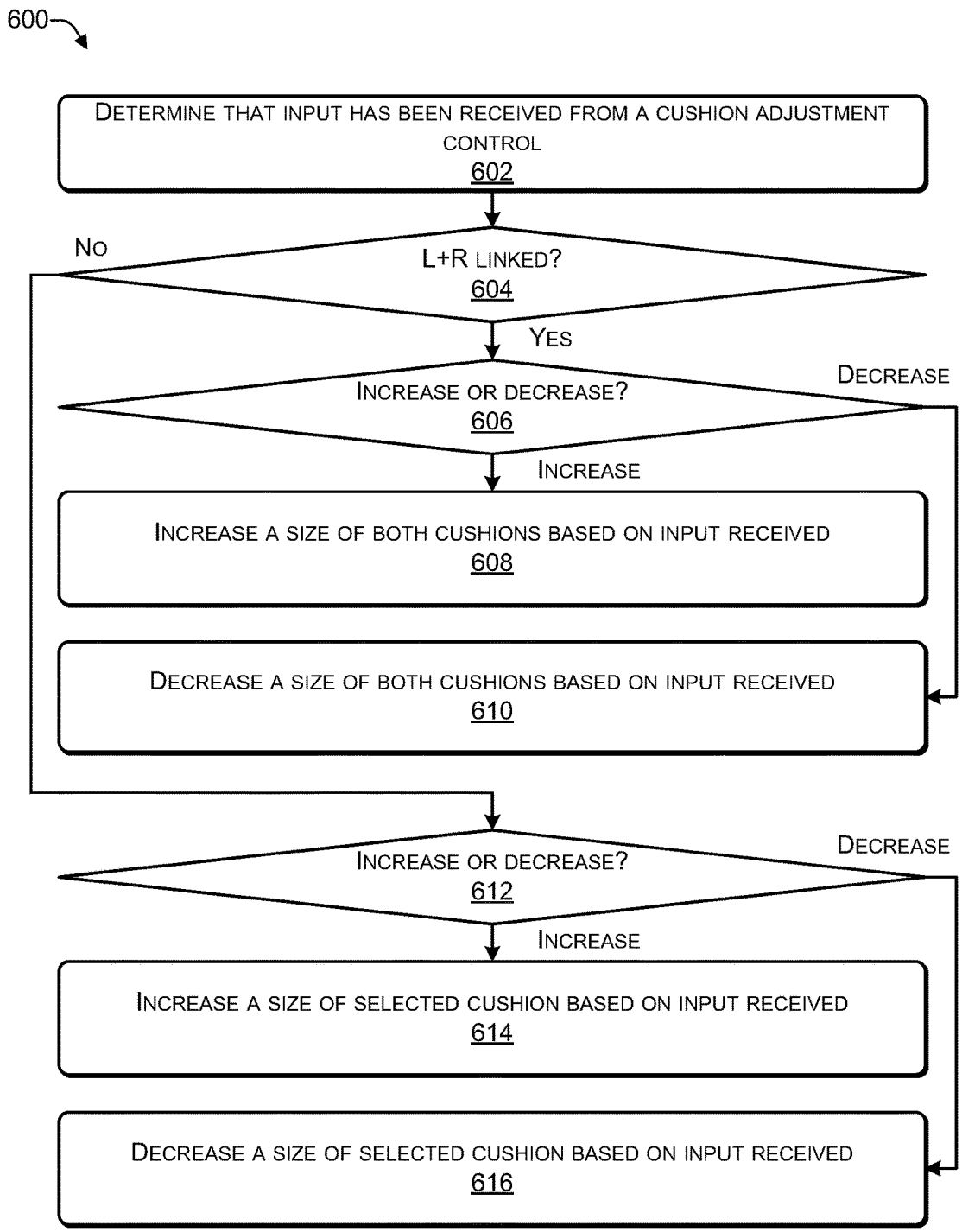
FIG. 6 is a flowchart of a process that includes modifying a size of one or both cushions of a headphone, according to some embodiments.

FIG. 6 is a flowchart of a process that includes modifying a size of one or both cushions of a headphone, according to some embodiments. The process 600 may be performed by the headphone 100 of FIG. 1.

At 602, a determination may be made that input has been received from a cushion adjustment control. At 604, a determination may be made whether the left and right cushions are linked. In response to determining, at 604, that "yes" the left and right cushions are linked, the process may proceed to 606. In response to determining, at 604, that "no" the left and right cushions are linked, the process may proceed to 612. For example, in FIG. 1, the headphone 100 may determine that input has been received via the cushion adjustment 136 control. The headphone 100 may be determine whether the cushion adjustment 136 has been set in the middle to engage the linkage 116 or whether the cushion adjustment 136 is set adjust the left or right cushion, e.g., disengaging the linkage 116.

At 606, a determination may be made as to whether the input from the cushion adjustment 136 control was to increase or decrease a size of both cushions. In response to determining, at 606, that the input was to increase, the process proceeds to 608, where a size of both cushions is increased based on the input. In response to determining, at 606, that the input was to decrease, the process proceeds to 610, where a size of both cushions is decreased based on the input.

At 612, a determination may be made whether the input was to increase or decrease a size of a single cushion. In response to determining, at 612, that the input was to increase, the process proceeds to 614, where a size of a selected cushion is increased based on the input. In response to determining, at 612, that the input was to decrease, the process proceeds to 616, where a size of a selected cushion is decreased an amount based on the input.

Figure 7:
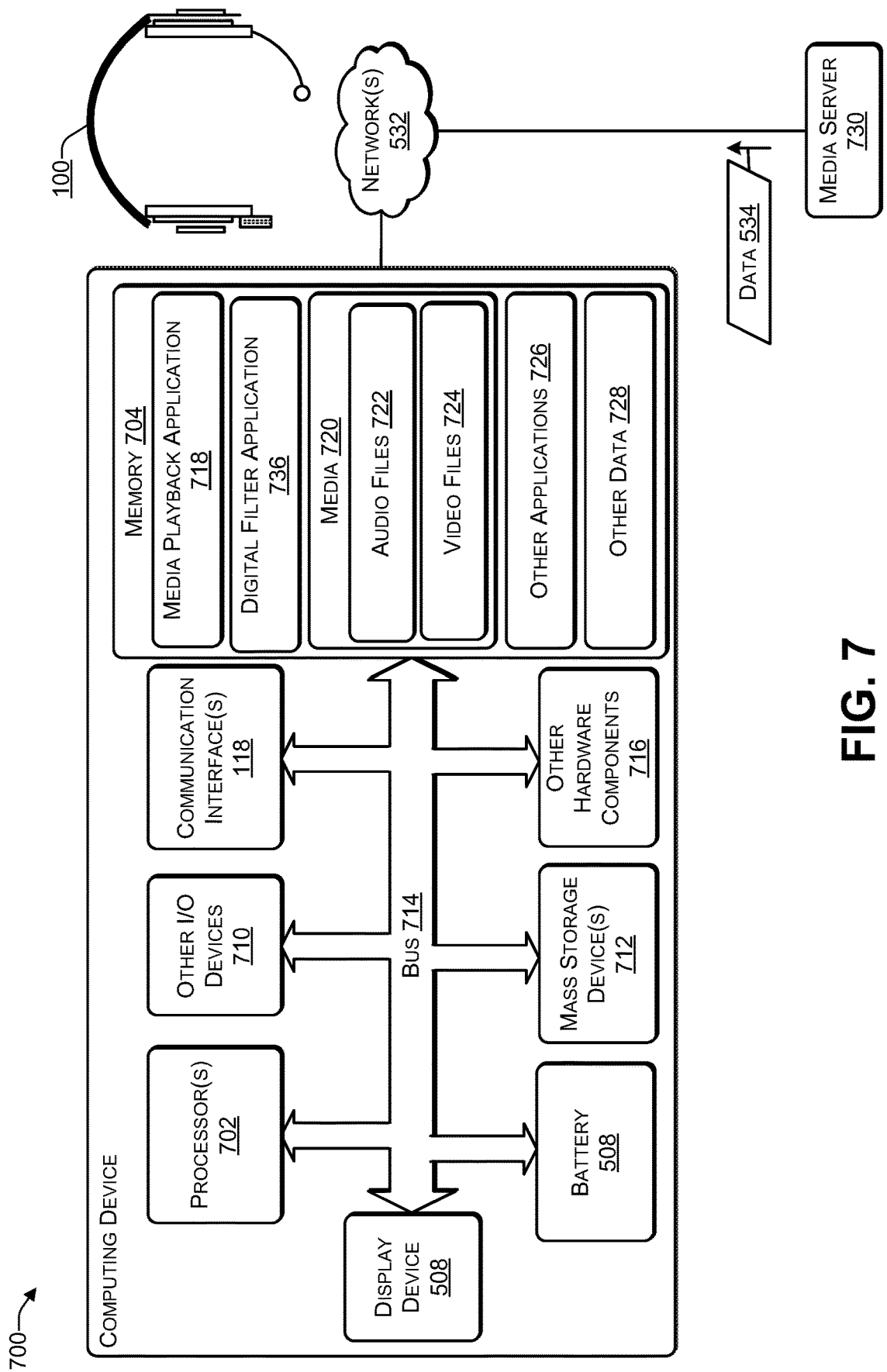
FIG. 7 illustrates an example configuration of a computing device that can be used to implement the systems and techniques described herein.

FIG. 7 illustrates an example configuration of the computing device 700 that can be used to implement the systems and techniques described herein, such as the media playback device 126 of FIG. 1 or the headphone 100. The computing device 700 may include one or more processors 702 (e.g., CPU, GPU, or the like), a memory 704, communication interfaces 706, a display device 708, other input/output (I/O) devices 710 (e.g., keyboard, trackball, and the like), one or more mass storage devices 712 (e.g., disk drive, solid state disk drive, or the like), and other hardware components 716, configured to communicate with each other, such as via one or more system buses 714 or other suitable connections. While a single system bus 714 is illustrated for ease of understanding, it should be understood that the system buses 714 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 702 are one or more hardware devices that may include a single processing unit or a number of processing units, all of which may include single or multiple computing units or multiple cores. The processors 702 may include a graphics processing unit (GPU) that is integrated into the CPU or the GPU may be a separate processor device from the CPU. The processors 702 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 702 may be configured to fetch and execute computer-readable instructions stored in the memory 704, mass storage devices 712, or other computer-readable media.

Memory 704 and mass storage devices 712 are examples of computer storage media (e.g., memory storage devices) for storing instructions that can be executed by the processors 702 to perform the various functions described herein. For example, memory 704 may include both volatile memory and non-volatile memory (e.g., RAM, ROM, or the like) devices. Further, mass storage devices 712 may include hard disk drives, solid-state drives, removable media, including external and removable drives, memory cards, flash memory, floppy disks, optical disks (e.g., CD, DVD), a storage array, a network attached storage, a storage area network, or the like. Both memory 704 and mass storage devices 712 may be collectively referred to as memory or computer storage media herein and may be any type of non-transitory media capable of storing computer-readable, processor-executable program instructions as computer program code that can be executed by the processors 702 as a particular machine configured for carrying out the operations and functions described in the implementations herein.

The computing device 700 may include one or more communication interfaces 118 for exchanging data via a network 532. The communication interfaces 118 can facilitate communications with a wide variety of networks and protocol types, including wired networks (e.g., Ethernet, DOCSIS, DSL, Fiber, USB etc.) and wireless networks (e.g., WLAN, GSM, CDMA, 802.11, Bluetooth, apt-X, Wireless USB, ZigBee, cellular, satellite, etc.), the Internet and the like. Communication interfaces 118 can also provide communication with external storage, such as a storage array, network attached storage, storage area network, cloud storage, or the like.

The display device 708 may be used for displaying content (e.g., information and images) to users. Other I/O devices 710 may be devices that receive various inputs from a user and provide various outputs to the user, and may include a keyboard, a touchpad, a mouse, a printer, audio input/output devices, and so forth.

The computer storage media, such as memory 704 and mass storage devices 712, may be used to store software and data. For example, the computer storage media may be used to store a media playback application 718 to playback media 720, including audio files 722 and video files 724. The computer storage media may be used to store other applications 726 and other data 728.

The computing device 100 may be connected to a media server 730 via a network 732. The computing device 100 may stream media files, such as data 734, over the network 732. The communication interface 706 may be used to playback media files and send audio data to the headphone 100 via a wired (e.g., the cable 120) or a wireless connection (e.g., Wi-Fi®, Bluetooth®, Apt-X, or the like).

Thus, a size of the cushions 108 of FIG. 1 of the headphone 100 may be automatically modified. For example, the size of the cushions 108 may be automatically modified from circum-aural to supra-aural. The external microphone 132 may be incorporated into one of the housings 104 of the headphone 100 to measure an ambient (e.g., environmental) noise level. When the ambient noise level exceeds a predetermined threshold, the headphone 100 may use the motors 114 to automatically adjust the cushions by changing the cushions from supra-aural to circum-aural to block more of the external ambient noise. When the ambient noise level subsides and is equal to or below the predetermined threshold, the headphone 100 may use the motors 114 to automatically adjust the cushions 108 by changing the cushions 108 from circum-aural to supra-aural. Of course, an override feature may enable a user to prevent the automatic adjustment in situations where the user desires to use the supra-aural cushions to hear the ambient environment or when the user desires supra-aural cushions to provide further noise isolation in a relatively quiet environment. In this way, the headphone 100 may automatically determine the ambient noise level associated with the user's environment and adjust the size of the cushions 108, adjust noise cancellation properties, adjust equalization (EQ), or any combination thereof. For example, if the user is in a noisy environment such as a bus or an airplane, the headphone 100 may automatically adjust the cushions 108 and use noise cancellation to reduce ambient noise.

The headphone cushions 108 may be adjusted automatically based on how the headphone 100 is being used. For example, if a user initiates a call (e.g., phone call, audio conferencing call, video conferencing call or another type of call) and starts using the voice microphone 128, then the headphone 100 may automatically adjust the cushion size and noise cancellation to emphasize voice clarity. As another example, if the headphone 100 detects a relatively broad spectrum of frequencies, indicating that the user is listening to music or watching a movie, the headphone 100 may automatically adjust the cushions 108 to circum-aural (e.g., to increase bass frequencies), and in some cases, add frequency equalization (EQ) to enhance the listening experience.

The cushions 108 may be automatically adjusted using the motors 114, such as, for example, piezoelectric motors built in to each of the housings 104. The circuit 202 may be built-in to the headphone 100 and may use machine learning to automatically expand or contract the cushions 108 based on the user's location, an activity in which the user is engaged, the ambient noise level, the application (e.g., a call, listening to music, listening to a movie, or the like) for which the headphone is being used, or any combination thereof. Of course, the user may override the settings selected by the headphone 100. For example, the user may turn off the auto-adjust feature and manually configure the cushions 108 using the control panel 112. The motors 114 may modify a size of the cushions 108 relatively quietly, e.g., generating no more than 10 decibels (db), to enable the cushions 108 to be adjusted without audibly impacting the user's experience. The motors 114 may be powered by the audio signal 220 of FIG. 2 being provided to the transducers 106.

The headphone 100 may monitor the audio 220 being sent to the transducers 106 and, if the voice microphone 128 is present, the audio 222 being provided by the user using the voice microphone 128. The headphone 100 may use the machine learning 212 to analyze the audio 220, 222 to determine an activity (e.g., listening to music, watching a movie, participating in a call, or the like) in which the user is engaged, determine an ambient noise level (e.g., using the external microphone 132 placed on an external surface of the headphone 100), and automatically adjust the headphone 100, including the cushion size, the aural characteristics, and the like, based on the activity and the ambient noise level.

If multiple users use the same headphone 100, each user may create a profile and use the profile selectors 138 on the control panel 112 to select a particular profile. For example, a first profile may be associated with a first user and a second profile may be associated with a second user. Each profile may customize the size of the cushions 108 (e.g., based on a size of the user's ears) and the aural characteristics (e.g., supra-aural or circum-aural, noise cancellation on or off, equalizer settings, and the like) of the headphone 100. In some cases, the profiles 216 may be stored in the memory 214 of the headphone 100 and a user may select the profile (e.g., profile 1 or profile 2) using the profile selector 138. As another example, the headphone 100 may use a nearfield wireless technology (e.g., Bluetooth, WiFi, ZigBee, or the like) to determine the user's identity based on a device (e.g., the computing device 700) associated with the user that is within a predetermined distance from the headphone 100 (e.g., a smartwatch that the user is wearing or a smartphone that the user is carrying), determine a user profile associated with the user, and automatically configure the headphone 100 based on the user profile. As yet another example, a particular user may use an application ("app") being executed by the smartwatch or smartphone to select one of the multiple profiles 216 (e.g., jazz music profile, rock music profile, movie profile, call profile, such as a phone call, a conference call, or the like). Selecting a particular profile of the profiles 216 on the app may cause the smartwatch or smartphone to send one or more instructions to the headphone 100 to configure the headphone 100 based on the profile. Thus, each user may create and use multiple profiles.

The headphone 100 may include the sensors 210 (e.g., accelerometer, gyroscope, and the like). The headphone 100 may use the data 240 from the sensors 210 to detect an activity (e.g., running, walking, stair climbing, weight lifting, or the like) and automatically adjust the size of the cushions 108 and the aural characteristics (e.g., supra-aural or circum-aural, noise cancellation on or off, equalizer settings, and the like) of the headphone 100 accordingly.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A headphone comprising:
a headband;
a first housing attached to a first end of the headband, the first housing comprising:
a first transducer;
a first cushion; and
a first motor to control a first size of the first cushion;
a second housing attached to a second end of the headband that is opposite the first end,
the second housing comprising:
a second transducer;
a second cushion;
a second motor to control a second size of the second cushion; and
a circuit located in the first housing, the circuit comprising:
one or more processors; and
a memory device to store instructions that are executable by the one or more processors to perform operations comprising:
determining a type of audio signal being sent to the first transducer and the second transducer, wherein the type of audio signal comprises one of voice, music, or movie; and
automatically adjusting the first size of the first cushion and the second size of the second cushion based at least in part on the type of audio signal.

2. The headphone of claim 1, further comprising:
an external microphone to determine an amount of external noise; and
wherein the operations further comprise:
determining that the amount of external noise exceeds a predetermined amount;
automatically inverting a phase of the external noise to create inverted noise; and
adding a portion of the inverted noise to the audio signal being sent to the first transducer and the second transducer to perform noise cancellation.

3. The headphone of claim 1, the operations further comprising:
receiving sensor data from one or more sensors;
determining a location of the headphone based at least in part on the sensor data; and
automatically adjusting the first size of the first cushion and the second size of the second cushion based at least in part on the location.

4. The headphone of claim 3, the operations further comprising:
determining an activity associated with a user of the headphone based at least in part on the sensor data; and
automatically adjusting the first size of the first cushion and the second size of the second cushion based at least in part on the activity.

5. The headphone of claim 4, wherein:
the activity is determined by using a machine learning algorithm to analyze the sensor data; and
the one or more sensors comprise an accelerometer, a gyroscope, and a global positioning satellite (GPS) sensor.

6. The headphone of claim 1, further comprising:
a communications interface included in either the first housing or the second housing,
wherein the communications interface includes at least one of:
a wireless communications interface, or
an electronic receptacle to accept a jack attached to a cable.

7. The headphone of claim 1, further comprising:
a boom comprising a flexible metal rod, wherein a first end of the boom is attached to either the first housing or the second housing; and
a voice microphone attached to a second end of the boom.

8. A headphone comprising:
a first cushion;
a first motor to adjust a first size of the first cushion;
a second cushion;
a second motor to adjust a second size of the second cushion;
a circuit comprising:
an external microphone;
one or more processors; and
a memory device to store instructions that are executable by the one or more processors to perform operations comprising:
determining a type of audio signal being sent to a first transducer and a second transducer of a headphone;
receiving an external audio signal from the external microphone;
determining an amount of external noise present based on the external audio signal; and
in response to determining that the amount of external noise exceeds a predetermined amount:
automatically initiating noise cancellation; and
based at least in part on the type of audio signal and the amount of external noise:
automatically adjusting, using the first motor, the first size of the first cushion; and
automatically adjusting, using the second motor, the second size of the second cushion.

9. The headphone of claim 8, wherein automatically initiating the noise cancellation comprises:
inverting a phase of the external noise to create inverted noise; and
adding a portion of the inverted noise to the audio signal being sent to the first transducer and the second transducer.

10. The headphone of claim 8, wherein:
the circuit further comprises one or more sensors; and
the operations further comprising:
receiving sensor data from the one or more sensors;
determining a location of the headphone based at least in part on the sensor data; and automatically adjusting the first size of the first cushion and the second size of the second cushion based at least in part on the location.

11. The headphone of claim 10, the operations further comprising:
determining, using machine learning, an activity associated with a user of the headphone based at least in part on the sensor data; and
automatically adjusting the first size of the first cushion and the second size of the second cushion based at least in part on the activity.

12. The headphone of claim 10, wherein:
the one or more sensors comprise an accelerometer, a gyroscope, and a global positioning satellite (GPS) sensor.

13. The headphone of claim 8, wherein:
in the first size, the first cushion and the second cushion have supra-aural properties.

14. The headphone of claim 8, wherein:
in the second size, the first cushion and the second cushion have circum-aural properties.

15. A headphone comprising:
an external microphone;
a headband;
a first housing attached to a first end of the headband, the first housing comprising:
a first transducer;
a first cushion; and
a first motor to control a first size of the first cushion;
a second housing attached to a second end of the headband that is opposite the first end, the second housing comprising:
a second transducer;
a second cushion;
a second motor to control a second size of the second cushion; and
a circuit located in the first housing, the circuit comprising:
one or more processors; and
a memory device to store instructions that are executable by the one or more processors to perform operations comprising:
receiving external audio data from the external microphone;
determining an amount of external noise based on the external audio data;
determining that the amount of external noise exceeds a predetermined amount;
automatically inverting a phase of the external noise to create inverted noise;
adding a portion of the inverted noise to an audio signal being sent to the first transducer and the second transducer to perform noise cancellation; and
automatically adjusting based at least in part on determining that the amount of external noise exceeds the predetermined amount:
the first size of the first cushion; and
the second size of the second cushion.

16. The headphone of claim 15, the operations further comprising:
determining a type of audio signal being sent to the first transducer and the second transducer, wherein the type of audio signal comprises one of voice, music, or movie; and
automatically adjusting the first size of the first cushion and the second size of the second cushion based at least in part on the type of audio signal.

17. The headphone of claim 15, the operations further comprising:
receiving sensor data from one or more sensors, wherein the one or more sensors comprise an accelerometer, a gyroscope, and a global positioning satellite (GPS) sensor;
determining a location of the headphone based at least in part on the sensor data; and
automatically adjusting the first size of the first cushion and the second size of the second cushion based at least in part on the location.

18. The headphone of claim 17, the operations further comprising:
determining an activity associated with a user of the headphone based at least in part on the sensor data; and
automatically adjusting the first size of the first cushion and the second size of the second cushion based at least in part on the activity.

19. The headphone of claim 15, further comprising:
a boom comprising a flexible metal rod, wherein a first end of the boom is attached to either the first housing or the second housing; and
a voice microphone attached to a second end of the boom.

20. The headphone of claim 15, the operations further comprising:
determining, based on voice data received from a voice microphone, that a user of the headphone is participating in a call;
dividing the audio signal being sent to the first transducer and the second transducer into three bands comprising a speech frequency band, a below speech frequency band, and an above speech frequency band; and
reducing a volume of the below speech frequency band and the above speech frequency band.

* * * * *